US007941336B1

(12) United States Patent
Robin-Jan

(10) Patent No.: US 7,941,336 B1
(45) Date of Patent: May 10, 2011

(54) SEGREGATION-OF-DUTIES ANALYSIS APPARATUS AND METHOD

(75) Inventor: de Lange Robin-Jan, Katy, TX (US)

(73) Assignee: D2C Solutions, LLC, Houston, TX (US)

(*) Notice: Subject to any disclaimer, the term of this patent is extended or adjusted under 35 U.S.C. 154(b) by 1217 days.

(21) Appl. No.: 11/518,685

(22) Filed: Sep. 11, 2006

Related U.S. Application Data

(60) Provisional application No. 60/716,531, filed on Sep. 14, 2005.

(51) Int. Cl.
*G06F 17/00* (2006.01)
(52) U.S. Cl. ............................. 705/9; 705/7
(58) Field of Classification Search ........................ 705/9
See application file for complete search history.

(56) References Cited

U.S. PATENT DOCUMENTS

| | | | | |
|---|---|---|---|---|
| 5,534,885 | A * | 7/1996 | Saitoh | 345/100 |
| 5,987,134 | A * | 11/1999 | Shin et al. | 713/159 |
| 6,434,607 | B1 * | 8/2002 | Haverstock et al. | 709/217 |
| 6,950,825 | B2 * | 9/2005 | Chang et al. | 1/1 |
| 7,113,914 | B1 * | 9/2006 | Spielmann et al. | 705/7 |
| 7,140,035 | B1 * | 11/2006 | Karch | 726/1 |
| 7,246,137 | B2 * | 7/2007 | Paulus et al. | 1/1 |
| 7,281,263 | B1 * | 10/2007 | LaMastres et al. | 726/2 |
| 7,392,397 | B2 * | 6/2008 | Brown et al. | 713/187 |
| 7,464,400 | B2 * | 12/2008 | Jindani et al. | 726/4 |
| 7,523,053 | B2 * | 4/2009 | Pudhukottai et al. | 705/30 |
| 7,644,008 | B1 * | 1/2010 | Issa et al. | 705/9 |
| 7,650,633 | B2 * | 1/2010 | Whitson | 726/6 |
| 7,752,562 | B2 * | 7/2010 | Mohanty et al. | 715/765 |
| 7,870,607 | B2 * | 1/2011 | Brown et al. | 726/21 |
| 7,886,342 | B2 * | 2/2011 | Jindani et al. | 726/4 |
| 2002/0026592 | A1 * | 2/2002 | Gavrila et al. | 713/201 |
| 2002/0059093 | A1 * | 5/2002 | Barton et al. | 705/10 |
| 2002/0144142 | A1 * | 10/2002 | Shohat | 713/200 |
| 2002/0194059 | A1 * | 12/2002 | Blocher et al. | 705/11 |
| 2004/0260566 | A1 * | 12/2004 | King | 705/1 |
| 2005/0209899 | A1 * | 9/2005 | King et al. | 705/8 |
| 2006/0059026 | A1 * | 3/2006 | King et al. | 705/7 |
| 2006/0074739 | A1 * | 4/2006 | King et al. | 705/9 |
| 2007/0100642 | A1 * | 5/2007 | Paulus et al. | 705/1 |
| 2007/0136622 | A1 * | 6/2007 | Price et al. | 714/25 |
| 2007/0233508 | A1 * | 10/2007 | Gillespie | 705/1 |
| 2009/0320088 | A1 * | 12/2009 | Gill et al. | 726/1 |

OTHER PUBLICATIONS

ISACA Professional Resources—Segregation of Duties Within Information Systems CISA Review Manual 2005.*
Leitch, Mathew, Matrix Mapping: the easiest and best way to map internal controls Retrieved from www.internalcontrolsdesign.co.uk/matrices/index.shtml.*
Hermann, Keith R, The one-page CFO Management Accounting, vol. 76, No. 8, Feb. 1995.*
Hamada, Takeo, Role-based Access Control in Telecommunications Service Management—Dynamic Role Creation and Management TINA Service Environment, Fujitsu Laboratories of America, ACM 1998.*
Matunda Nyanchama, The Role-Graph Model and Conflict of Interest ACM Transactions on Information and System Security, vol. 2, No. 1, Feb. 1999.*

(Continued)

*Primary Examiner* — Scott L Jarrett

(74) *Attorney, Agent, or Firm* — Eric Cernyar

(57) ABSTRACT

A method and user interface for performing and displaying a segregation of duties analysis on an enterprise resource planning system or back office software system displays potential segregation of duty violations using selectable Venn, Euler, or Veitch diagrams.

15 Claims, 10 Drawing Sheets

OTHER PUBLICATIONS

Lihtle, Susan S., Segregation of Duties in ERP Internal Auditor, Oct. 2003.*
Botha, R.A., Separation of duties for access control enforcement in workflow environments IBM Systems Journal, vol. 30 No. 4, 2001.*
Rein, Judith Ann, Variables and Venn Diagrams The University of Arizona, 1997.*
Seperation of Duties—Wikipedia definition Wikipedia.org—Retrieved Aug. 10, 2010.*
Venn Diagram—Wikidpedia definition Wikipedia.org, Retrieved Aug. 10, 2010.*
Karnaugh Map—Wikipedia definition Wikipedia.org, Retrieved Aug. 10, 2010.*
Euler Diagrams 2004 Euler Diagrams Conference, Sep. 2004.*
Sandhu, Ravi et al., Role Based Administration of User-Role Assignment: The URA97 Model and its OracleImplementation 1998.*
Sandhu et al., The ARBAC99 Model for Administration of Roles Geogre Mason University, 1999.*

* cited by examiner

Drill Down Analysis

| UserID | FullName | A: PUR - Vendor Master Data | | | B: PUR - Purchase Order Entry | | | C: PUR - R... |
|---|---|---|---|---|---|---|---|---|
| | | Role | Profile | | Role | Profile | | Role |
| ⊟ USDEDOUGA | Deborah Dougan | AR_PM_VIEW | T-D7021859 | | HRPROJ_BC | T-D7022214 | | AR_SD_... |
| | | HR_BENEFIT | T-D7021603 | | AR_PM_MGR | T-D7021864 | | Manually |
| | | HR_GENERIC | T-D7022009 | | | | | Manually |
| | | AR_SD_REPO | T-D7021882 | | | | | |
| | | Manually Assi | T-D7021883 | | | | | |
| | | Manually Assi | T-D7021884 | | | | | |
| | | HRPROJ_BC | T-D7022214 | | | | | |
| | | AR_PM_MGR | T-D7021864 | | | | | |
| | | | | 8 | | | 2 | |
| ⊟ USDEHANNA | Debbie Hanna | | | 8 | | | 8 | |
| ⊟ USHUHICKM | Hugh Hickman | | | 8 | | | 8 | |
| ⊟ USJFORSH | Jason Forshee | | | | | | | |
| ⊟ USJAGATIN | Jamie Gatin | AR_PM_VIEW | T-D7021859 | | EDI_INVOICE | T-D7021582 | | AR_SD_... |
| | | HR_BENEFIT | T-D7021603 | | AR_PM_MGR | T-D7021864 | | Manually |
| | | HR_GENERIC | T-D7022009 | | | | | Manually |
| | | AR_SD_REPO | T-D7021882 | | | | | |
| | | Manually Assi | T-D7021883 | | | | | |
| | | Manually Assi | T-D7021884 | | | | | |
| | | EDI_Invoice_V | T-D7021582 | | | | | |
| | | AR_PM_MGR | T-D7021864 | | | | | |
| | | | | 8 | | | 2 | |
| ⊟ USJEFODOR | Jeffrey Fodora | | | 8 | | | 8 | |
| ⊟ USJOMOREH | Joseph Morehead | | | | | | | |

Fig. 7

SEGREGATION-OF-DUTIES ANALYSIS APPARATUS AND METHOD

RELATED APPLICATIONS

This application claims priority to U.S. Provisional Application No. 60/716,531, filed Sep. 14, 2005, and entitled "New Methodology to Execute Segregation of Duties (SOD) Analysis in an ERP system, including software application and strategy to remediate SOD findings," which application is incorporated herein by reference.

FIELD OF THE INVENTION

This invention relates generally to segregation of duties (SOD) analyses, and more particularly to a new, user-friendly methodology for performing a SOD analysis.

BACKGROUND AND SUMMARY OF THE INVENTION

Modern, soundly-run business organizations impose internal control mechanisms on material business functions, such as financial transactions, sales, and purchases, to prevent fraud, embezzlement, errors, and abuse and to promote accountability between employees. One of the most fundamental internal control mechanisms is the establishment of segregation of duties (SOD) (also referred to as "Separation of Duties"). The purpose of SOD is to ensure that more than one person is required to complete a task that is subject to abuse. To implement a SOD on a given business function, the function is divided into separate, necessary steps or activities, and the steps or activities are assigned to different persons or organizations. SOD mechanisms often segregate not only who has authorization to conduct a particular transaction, but also who has authorization to retrieve or record financial information concerning that transaction. As most large modern businesses use large enterprise resource planning (ERP) systems to integrate the data and processes of the business into a unified system, it is critical that SOD controls be incorporated into the company's ERP system.

As employees join and leave a business organization, or get promoted or given new assignments within that organization, the organization's ERP system must be continually updated to provide those employees with the necessary authorizations to perform their assigned tasks, and to delete those authorizations they no longer need. Over time, the originally well-designed internal controls implemented by a system can become outdated, creating new opportunities for fraud and abuse. Therefore, as people join and leave and move about within a company, it is important that companies routinely carry out SOD analyses to ensure that their internal control mechanisms are maintained.

Furthermore, as a business grows into new areas, or as previously unanticipated abuses or internal control failures are discovered, businesses need to continually revise and refine their internal controls and develop new SOD mechanisms to prevent further failures. As a company's internal controls grow more sophisticated and complex, the task of undertaking a SOD analysis grows exponentially more complex.

Standard methodologies for performing SOD analyses are tedious, cumbersome, and inadequate. One approach to a SOD analysis is to have persons versed in a database language painstakingly draft queries—sometimes thousands of queries—that are run to produce result sets or reports identifying potential SOD violations. Some SOD tools provide numerous predefined SOD queries, but the process lacks an adequately visually intuitive or user-friendly interface for setting up the SOD analysis or visualizing the results of the SOD analysis.

To address these problems, the inventor undertook to develop a more intuitive interface for setting up the SOD analysis and for visualizing the results of a SOD analysis. In particular, he developed a user interface that uses Venn, Euler, or Veitch diagrams or derivatives or equivalents thereof to depict potential Segregation of Duty (SOD) problems or violations and unauthorized access across a business's Enterprise Resource Planning (ERP) applications. An interesting and insightful discussion of Venn diagrams is set forth in the following article, which is herein incorporated by reference: Frank Ruskey and Mark Weston, "Venn Diagrams," *The Electronic Journal of Combinatorics* (edition dated Jun. 18, 2005).

BRIEF DESCRIPTION OF THE DRAWINGS

FIGS. 7-8 are graphical representations of drill-down pop-up screens presented by selecting selectable Venn diagram regions.

DETAILED DESCRIPTION

The present invention is directed to a method and system for SOD analysis that uses Euler or Venn diagrams—including variants such as Spider diagrams and Johnston diagrams—or their equivalents, such as Karnaugh maps, to depict potential Segregation of Duty (SOD) problems or violations and unauthorized access across a business's Enterprise Resource Planning (ERP) applications. It is contemplated that the SOD analysis will be carried out using a user interface running on an end user computer 910 (FIG. 9), which retrieves relevant data and data sets from a back-end server 950 storing the ERP database, and which interacts with a SOD analysis engine running on the end user computer 910 or, more preferably, a separate high speed computer 960 optimized for rigorous data crunching and analysis.

It is also intended that the current invention interact with typical ERPs, such as those systems marketed by SAP AG® headquartered in Walldorf Germany, Oracle Corp.® of Redwood Shores, Calif., and J. D. Edwards® of Denver, Colo. SAP®'s systems enable end users to specify different types of security system entities—"profiles," "roles," and "users"—with access to various business activities. Oracle®'s and PeopleSoft®'s systems use "roles" and "profiles." J. D. Edwards® uses the term "groups," which correlates to "roles" in SAP.®

In general, a SOD analysis involve numerous steps, including connecting to and loading relevant data from the company's back-end server 950; configuring the business areas to be subjected to a SOD analysis, and performing and presenting the SOD analysis.

Figure 1:
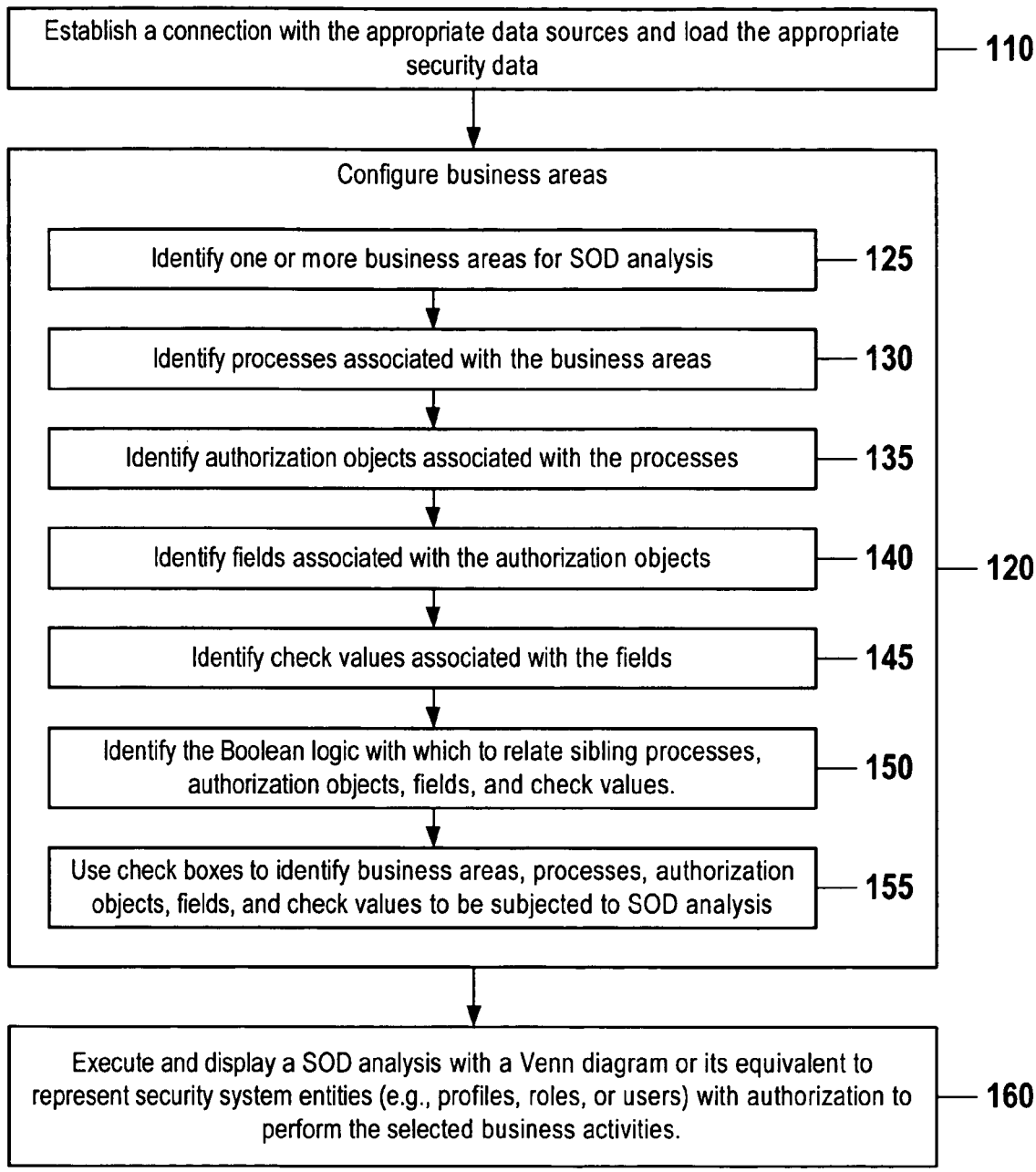
FIG. 1 is a flow chart of an embodiment of a method of performing a SOD analysis on an enterprise resource planning (ERP) system, which focuses on configuring the business areas to be subjected to the SOD analysis.

FIG. 1 depicts a flow chart of one embodiment of a method of performing a SOD analysis on an ERP system. In block 110, a connection is established with the appropriate data source on the back-end server 950, and the appropriate security data is loaded therefrom. Because methods of connecting to, and loading data from, data sources on back-end servers are well known in the art, those methods are not described in detail here.

In block 120, the user configures business areas. A business area is a set of activities protected by internal controls and closely monitored to prevent fraud and self-dealing by company employees. An example of a business area is "purchasing." Many companies have policies that explicitly define which jobs perform which functions in a given business area.

Figure 3:
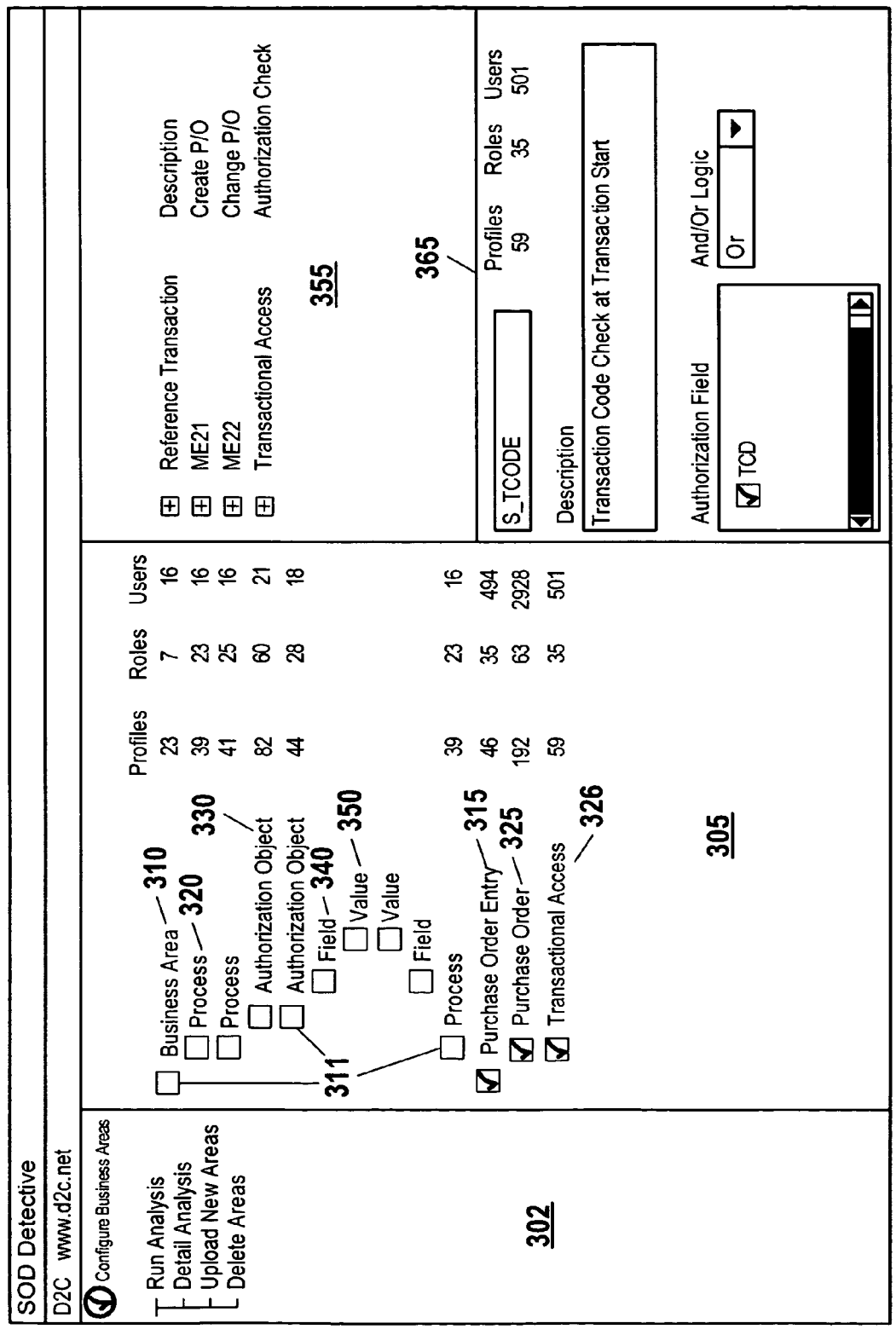
FIG. 3 is a graphical representation of one embodiment of a user interface for configuring business areas to be subjected to a SOD analysis.

The configuration of business areas lays the foundation for the subsequent SOD analysis. FIG. 3 is a graphical representation of one embodiment of a user interface 300 for configuring business areas to be subjected to a SOD analysis. The user interface includes a navigation pane 302 to the far left, a configuration pane 305 (large pane in the left half of the screen), and a reference transaction pane 355 (large pane in the right half of the screen).

Business areas are configured within the configuration pane 305 using a top-down hierarchical structure that defines a business area 310 as a group of processes 320, associates processes 320 with authorization objects 330, assigns fields 340 to authorization objects, which fields 340 may be further associated with check values 350. For example, "procurement" may be defined as a business area and subdivided into three processes or activities—defining the requirement, purchasing the requirement, and approving the invoice for payment. Ideally, a SOD mechanism would require at least three different persons to carry out these three distinct processes or activities. As another example, "purchase order entry" 315 could be defined as a business area involving two processes—filling out a purchase order 325 and authorizing the transaction 326. The authorization objects, fields, and check value sets associated with any given process are usually specified as part of an ERP security structure.

To configure the business areas, the user interface 300 provides menus (not shown) and/or other mechanisms, such as dragging and dropping reference transactions from the reference transaction pane 355 to the configuration pane 305, to specify business areas and the processes, authorization objects, fields, and check value sets associated therewith. The configuration pane 355 provides checkboxes 311 next to each business area, process, authorization object, field, or check value so that the end user can identify which business areas, processes, authorization objects, fields, and check values will be evaluated as part of the SOD analysis.

An important part of configuring the business areas is defining the logic with which sibling processes and authorization objects will be evaluated when performing the SOD analysis. As shown in FIG. 3, business areas are structured in a hierarchical, tree-like structure. Each "branch" in the tree represents independent collections of authorizations, profiles, and users. The SOD analysis, starting with the lowest branch, compares each collection in each branch (whose checkbox 311 has been selected) with the corresponding collections in any "sibling" branches (whose checkboxes 311 have also been selected)—i.e., branches that descend from a common parent—to determine which security system entities (e.g., "profiles," "users," and "roles") have access to all (if AND logic is used) or some (if OR logic is used) of the processes, authorization objects, fields, or check values of a given tree branch. This process is then repeated for each next hierarchical step up the tree until the collection analysis is complete.

To facilitate this analysis, the user interface 300 presents a box 365 in the left-hand portion of the screen to enable the user to specify the AND or OR logic with which the process or object should be evaluated with respect to any sibling processes, authorization objects, fields, or check values. AND logic should be specified to evaluate security system entities having access to that process, object, field, or value and a sibling process, object, field, or value. For example, if a business process required both authorization to access the database and authorization to execute a transaction, specification of AND logic would yield the collection of security system entities having both authorizations. OR logic should be specified to evaluate security system entities having access to that process, object, field, or value or a sibling process, object, field, or value. For example, if a business process provides different authorization objects for transactions A, B, and C, the specification of OR logic would yield the collection of security system entities that have authorization to execute any of transactions A, B, or C.

In the foregoing manner, the user interface 300 facilitates execution of the business area configuration steps 125-155 set forth in FIG. 1. FIG. 1 summarizes these steps as follows. In block 125, identify one or more business areas for SOD analysis. In block 130, identify processes associated with the business areas. In block 135, identify authorization objects associated with the processes. In block 140, identify fields associated with the authorization objects. In block 145, identify check values associated with the fields. In block 150, identify check values associated with the fields. In block 155, use check boxes to select the particular business areas, processes, authorization objects, fields, and check values that will be subjected to SOD analysis.

After the business areas have been configured, the Boolean logic specified, and the appropriate check boxes selected, the next step in the method of FIG. 1 is to execute and display a SOD analysis, as depicted in block 160. To display the SOD analysis, a Euler or Venn diagram or its equivalent is used to represent security system entities (e.g., profiles, roles, or users) with authorization to perform the selected business activities.

Figure 4:
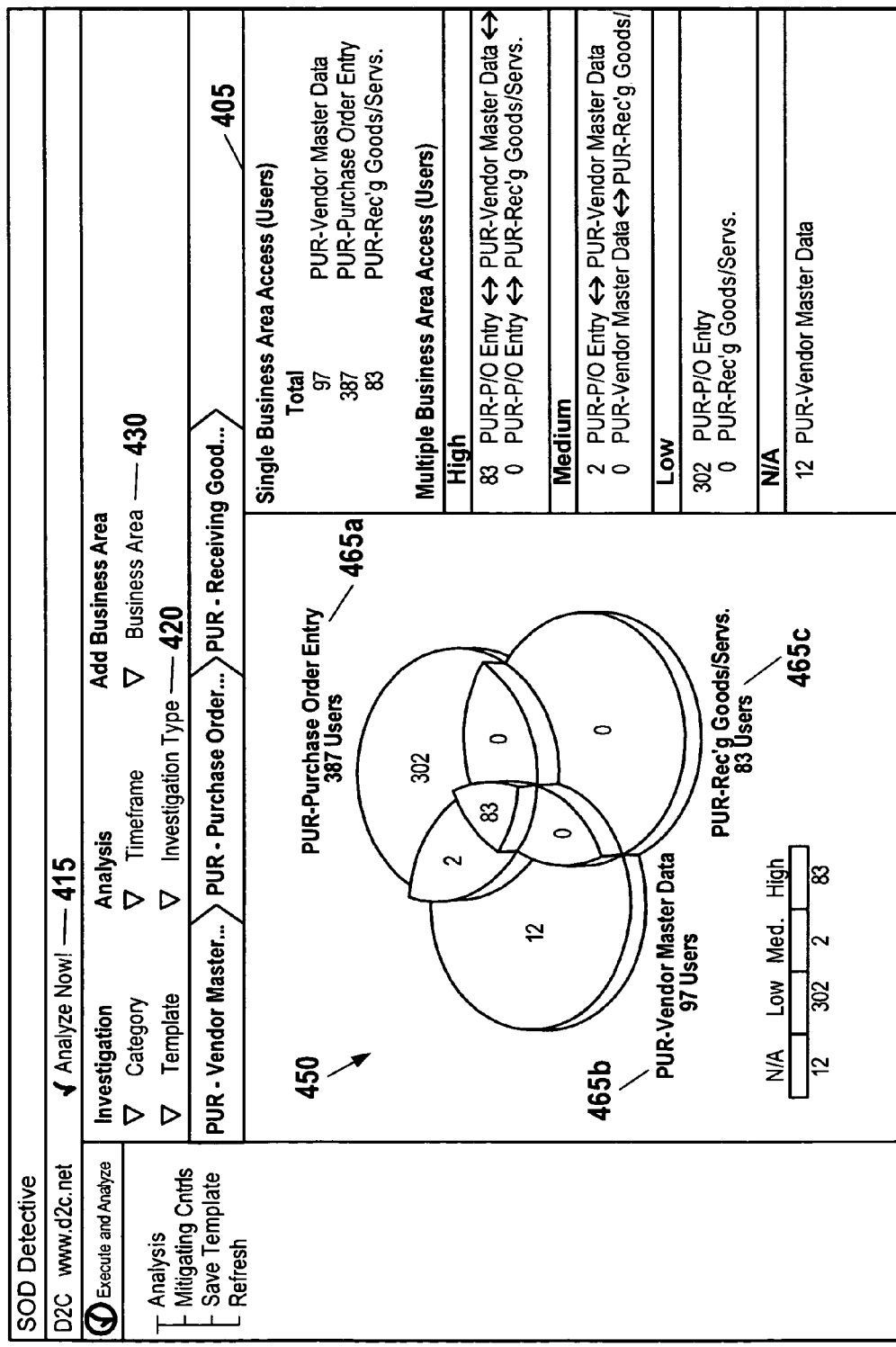
FIG. 4 is a graphical representation of one embodiment of a user interface for displaying the results of a SOD analysis on three business activities, using a three-dimensional Venn diagram.

FIG. 4 is a graphical representation of one embodiment of a user interface 400 for executing a SOD analysis and displaying the results of a SOD analysis on three business areas.

To execute a SOD analysis (also referred to as an "investigation"), the user right clicks on the "Investigation Type" drop down menu 420. A pop-up screen (not shown) is presented enabling the user to select the type of security system entity (e.g., profiles, roles, or users) for which the investigation will display potential SOD violations. Next, the user right clicks on the "Business Area" drop down menu 430 to specify up to five different business areas or processes for which the analysis will be performed. As business areas and processes are added, the number of security system entities associated with that business area or process is listed in the right hand pane 405 of the screen.

Next, the user selects the "Analyze Now!" button 415 near the top of the screen. In response, the user interface 400 displays the selected business areas and processes as an apparent three-dimensional Venn diagram 450 made up of overlapping contours, with each overlap representing segregation of duties issues. The intersecting regions within the Venn diagram 450 represent security system entities have been granted access to multiple business areas or processes. Individuals in the center intersecting region 455 represent security system entities that have been granted access to all the business areas or processes subjected to the SOD analysis.

As shown in FIG. 4, adjacent each of the contours that make up the Venn diagram 450 are labels that identify the business area or process 465a-c corresponding to the contours. Beneath each label, the user interface 400 displays the total number of security system entities (e.g., users, roles, or profiles, depending on the investigation type) associated with the corresponding business area or process. Furthermore, a number is superimposed on each region of the Venn diagram 450 representing the number of security system entities having authorization to perform all of, but no more than, the selected activities represented by that region. To illustrate, the business area "PUR-Purchase Order Entry" 465a in FIG. 4 has a total of 387 users. Of these 387 users, 83 of them also have access to both of the other selected business areas 465b and 465c; and two of them have access to business area 465b but not to business area 465c. The remaining 302 of these users have access to business area 465a but not to either of business areas 465b or 465c. There are no users that have access to business areas 465a and 465c but not to 465b. As can be seen, the sum of the number of users within each region of the business area 465a, that is, 302+2+83+0, adds up to the total (387) depicted adjacent the label for the business area 465a.

Figure 5:
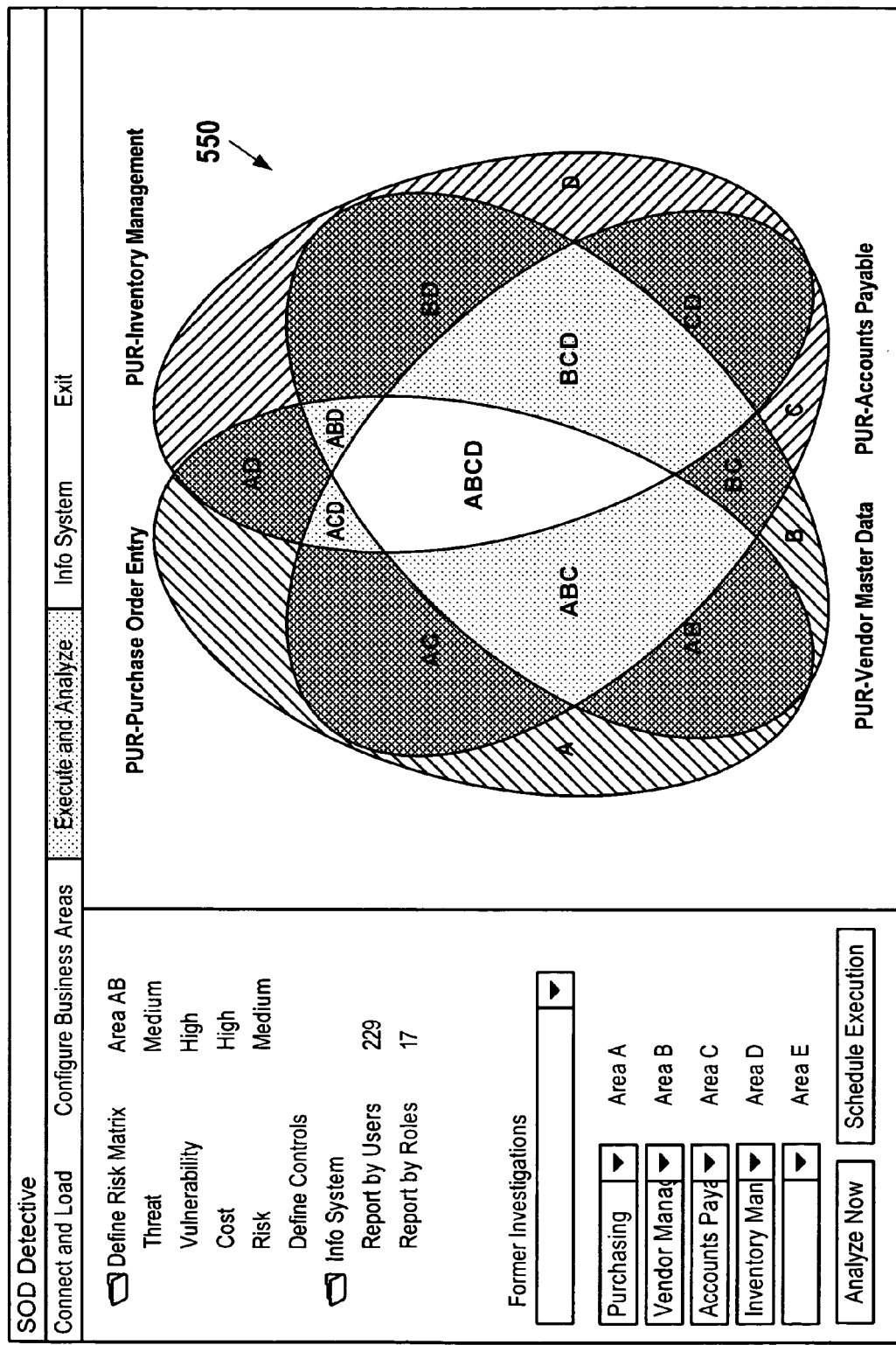
FIG. 5 is a graphical representation of an alternative embodiment of a user interface for displaying the results of a SOD analysis on four business activities, using a 4-ellipse Venn diagram.
Figure 6:
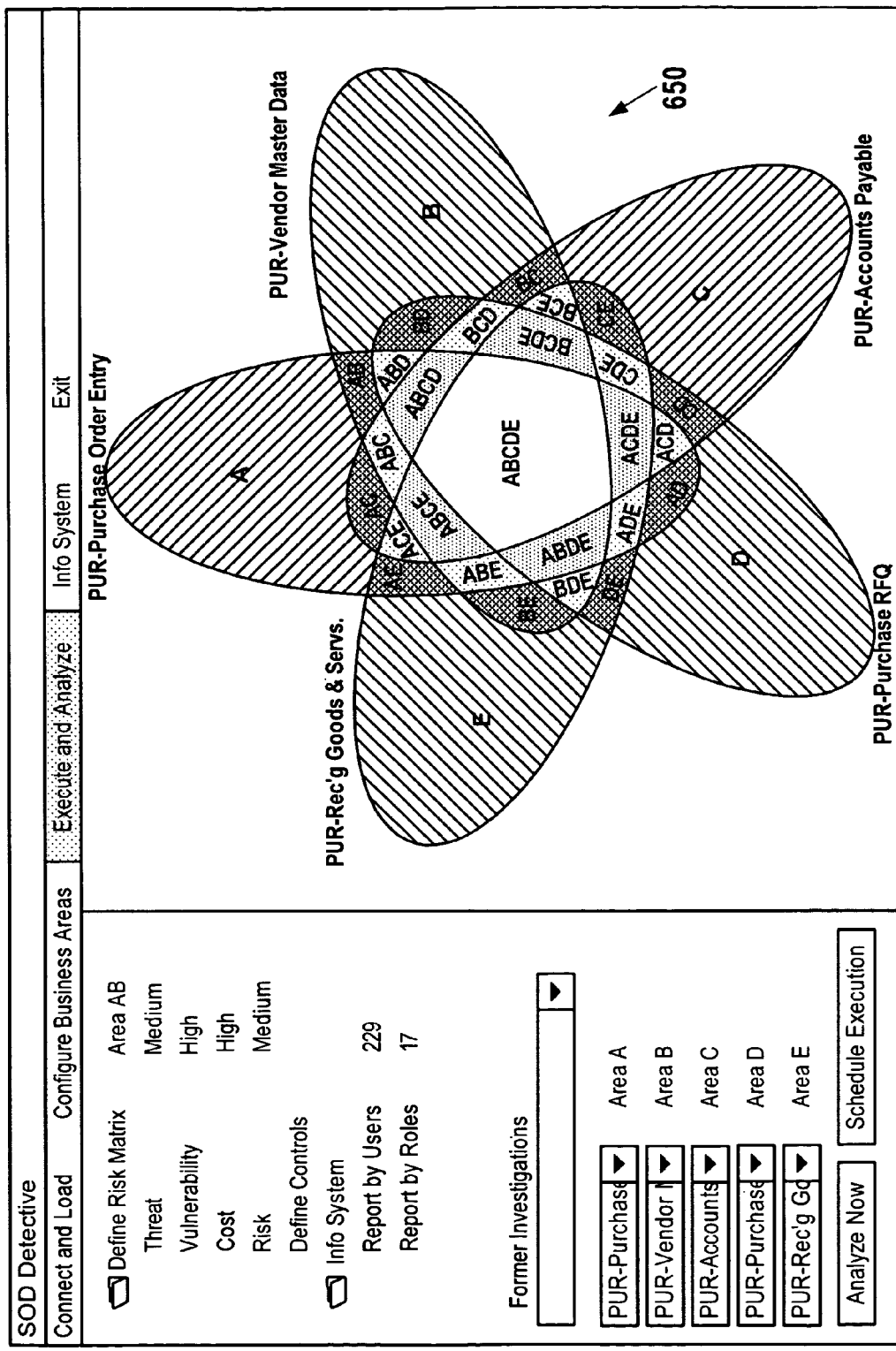
FIG. 6 is a graphical representation of an alternative embodiment of a user interface for displaying the results of a SOD analysis on five business activities, using a 5-ellipse Venn diagram.
Figure 11:
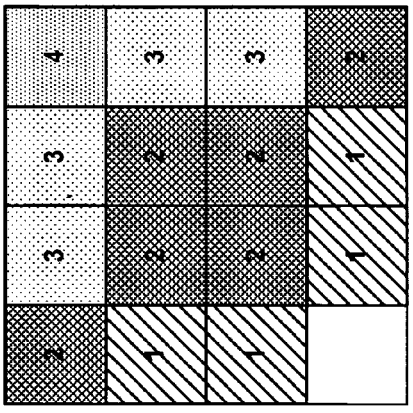
FIG. 11 is a graphical representation of an alternative embodiment of a user interface for displaying the results of a SOD analysis on five business activities, using a 4×4 Veitch diagram.

FIG. 4 illustrates a 3-contour Venn diagram 450 which analyzes the SOD overlap between three selected business areas or processes. FIG. 5 illustrates an alternative embodiment of a user interface 500 with a 4-contour Venn diagram 550 for analyzing the SOD overlap between four selected areas or processes. FIG. 6 illustrates yet another embodiment of a user interface 600 with a 5-contour Venn diagram 650 for analyzing the SOD overlap between five selected areas or processes. FIG. 11 is a graphical representation of yet another alternative embodiment of a user interface 1100 for displaying the results of a SOD analysis on five business activities, using a 4×4 Veitch diagram 1110 (also known as a Karnaugh map). The numbers displayed in the Veitch diagram 1110 are representative of the number of overlapping regions. Preferably, these numbers would be replaced with counts of the actual number of security system entities having access to the corresponding regions, as depicted in FIG. 4.

Due to prohibitions on the use of color in patent drawings, cross hatching and shading in the Venn diagrams 550 and 650 of FIGS. 5 and 6 and in the Veitch diagram 1110 of FIG. 11 illustrate coloring of the Venn or Veitch diagram regions to focus the user on overlapping areas. For example, the region ABCD in FIG. 5 or the region ABCDE in FIG. 6 are preferably shaded with a bright color such as red, to draw attention to the area that most urgently needs remediation. Regions representing overlaps of all but one of the analyzed business areas or processes—e.g., regions ABC, ABD, ACD, and BCD in FIG. 5 or regions ABCD, ABCE, ABDE, ACDE, and BCDE in FIG. 6—would be shaded with a different common color, such as white. Regions representing overlaps of just two of the analyzed areas or processes—e.g., regions AB, AC, AD, BC, BD, and CD in FIG. 5 or regions AB, AC, AD, AE, BC, BD, BE, CD, CE, and DE in FIG. 6—would be shaded with another distinct common color, such as dark gray. Regions representing non-overlapping areas or processes—e.g., regions A, B, C, and D in FIG. 5 or A, B, C, D, and E in FIG. 6—would be shaded with yet another distinct common color, such as light gray. As an alternative to or in addition to color, these regions may be marked with patterns like those depicted in FIGS. 5, 6, and 11.

In the preferred embodiments of the invention, the different regions of the Venn, Euler, or Veitch diagram are selectable, so that the end user can "drill down" on any given region to understand the sources of a SOD conflict. FIG. 7 is a graphical representative of a drill-down pop-up screen 700 presented by selecting a selectable 3-contour Venn Diagram region, where "users" were selected as the type of security system entity to be subject to the SOD analysis. The drill-down screen 700 identifies the user IDs 710 and names 720, if any, of the users having access to all three selected business areas or processes. For each business area and user, the drill-down screen 700 lists the number of ERP roles 730 and ERP profiles 740 assigned to that user. Expand view and collapse view buttons 750 are also provided to display a complete list of the ERP roles 730 and/or ERP profiles 740 assigned to that user.

Figure 8:
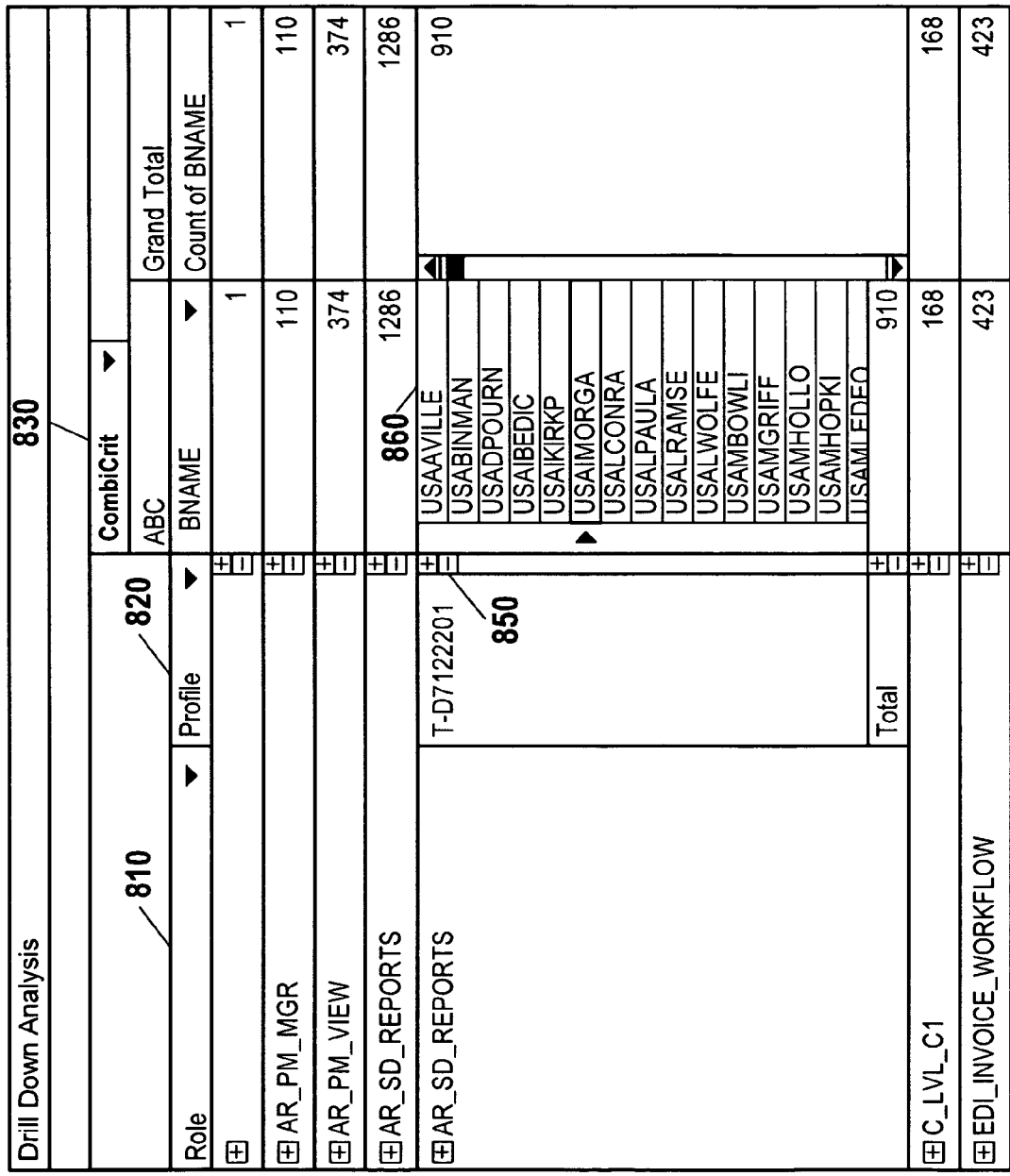

FIG. 8 is a graphical representation of another drill-down pop-up screen 800 presented by selecting a selectable Venn Diagram region, where "roles" were selected as the type of security system entity to be subjected to SOD analysis. This drill-down screen 800 identifies the roles 810 and profiles 820 having access in the ERP to perform all of the business areas or processes represented by the selected Venn Diagram region. Another column 830 lists the number of users that have been assigned to those roles and profiles. Expand view and collapse view buttons 850 are provided to display a complete list of the users 860 that have been assigned to a role 810 or profile 820.

Figure 9:
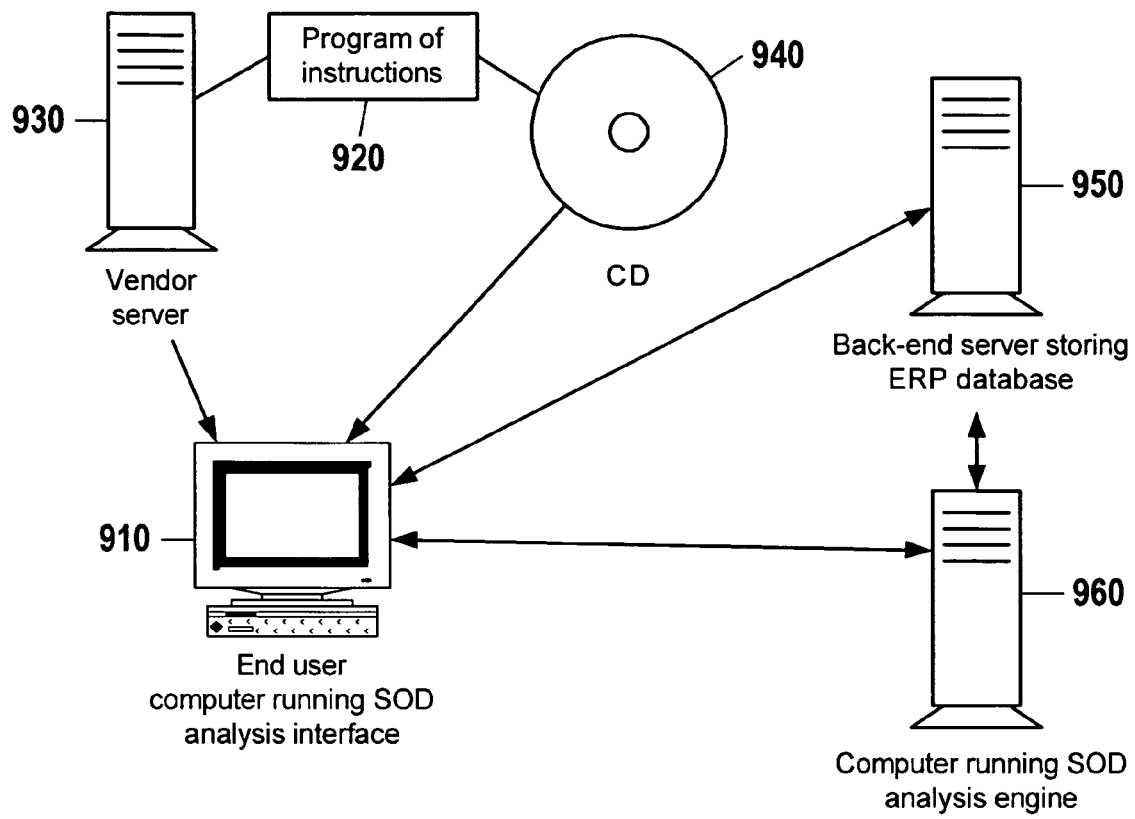
FIG. 9 is a block diagram that illustrates a computer readable medium tangibly embodying a representation of a program of instructions adapted to be executed by a computer to perform a SOD analysis.

FIG. 9 is a block diagram that illustrates a computer readable medium, such as a compact disc 940, a memory stick (not shown), the hard drive (not shown) of a vendor server 930, or the random access memory (not shown) of a computer 910 which tangibly embodies a representation of a program of instructions 920 adapted to be executed by a computer 910 to display a SOD analysis using Euler diagrams, Venn diagrams, Veitch diagrams, or their equivalents. FIG. 9 also illustrates a business method in which an end user downloads a program of instructions 920 from a server 930 running a vendor's web site to a computer 910. FIG. 9 also illustrates the fact that various parts of a SOD analysis can, and often will, be distributed among multiple computers in multiple locations and even in multiple countries. For example, the user interface that displays the Euler, Venn, or Veitch diagrams or their equivalents could run on computer 910 in the United States, the data subjected to the analysis could be retrieved from a separate computer 950 in Hong Kong storing the ERP database, and the computer 960 running the SOD analysis engine (i.e., the computer doing potentially millions of calculations and comparisons) could be located in India.

Figure 10:
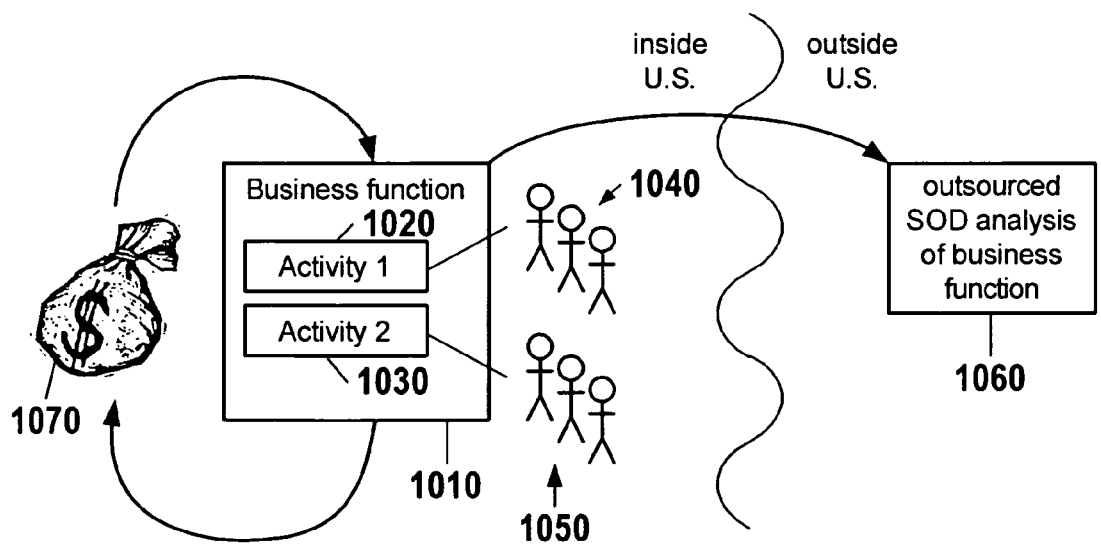
FIG. 10 is a block diagram that illustrates a method of doing business comprising performing a business function involving at least two activities, wherein the business function has been subjected to a SOD analysis.

FIG. 10 is a block diagram that illustrates a method of doing business comprising performing a business function 1010 (such as purchasing) in the United States involving at least two activities 1020 and 1030, wherein the business function 1010 has been subjected to a SOD analysis 1060 performed outside the United States. In accordance with this method, one set of security system entities 1040 is granted access to a first activity 1020 (such as accessing a database) needed to carry out the business function 1010, and a second set of security entities 1050 is granted access to a second activity 1030 (such as authorizing transfer of funds 1070 to a third party) needed to carry out that business function 1010. FIG. 10 is intended to support the extension of the scope of this patent to companies doing business in the United States that attempt to circumvent the patent by outsourcing a SOD analysis as described in this patent to a foreign country.

Figure 2:
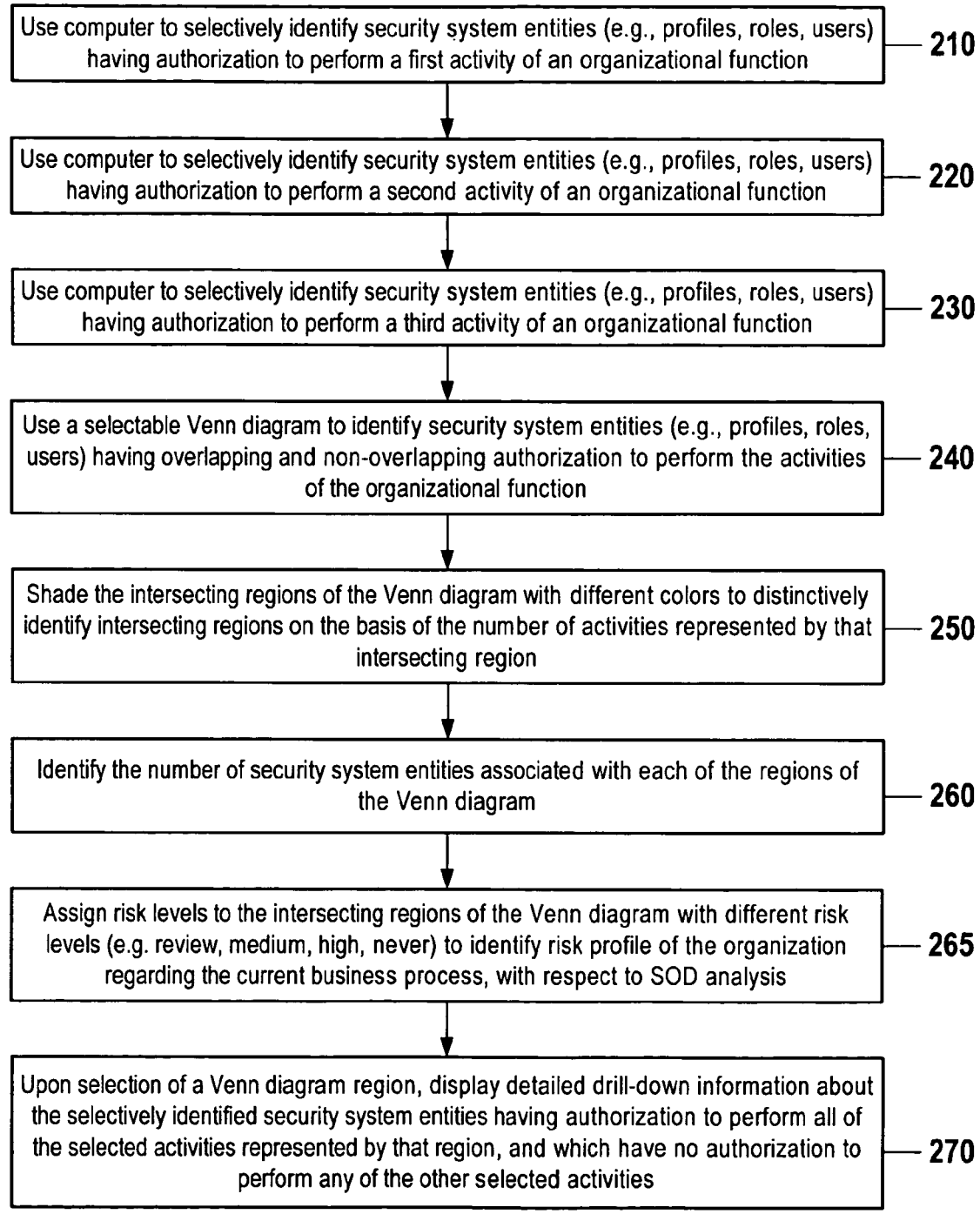
FIG. 2 is a flow chart of another embodiment of a method of performing a SOD analysis on an ERP system, which is less specific about setting up the SOD analysis but which is more specific about how the results of a SOD analysis are presented to the end user.

FIG. 2 is a flow chart of an, embodiment of a method of performing a SOD analysis on an ERP system, which generalizes the steps used to set up the SOD analysis and specifies how the results of a SOD analysis are presented to the end user. In blocks 210-230, a computer is used to selectively identify security system entities (e.g., profiles, roles, users) having authorization to perform each of three different activities of an organizational function. These three different activities are distinguished by referring to them as "first," "second," and "third" activities—but such reference here or in the claims does not denote the rank, sequence or order in which the activities are performed. In block 240, a computer is used to generate and display a selectable Venn, Euler, or Veitch diagram representing security system entities having overlapping and non-overlapping authorization to perform the steps of the organizational function. In block 250, the intersecting regions of the Venn, Euler, or Veitch diagram are color-coded to distinctively identify the number of SOD-analyzed activities represented by each intersecting region. In block 260, the number of security system entities associated with each of the regions of the Venn, Euler, or Veitch diagram are displayed on each corresponding region. In block 265, by using a mouse to right click on a Venn, Euler, or Veitch Diagram intersection, risk levels to the intersecting regions of the Venn diagram can be assigned using different risk levels (e.g. review, medium, high, never) to identify the risk profile of the organization regarding the current business process, with respect to SOD analysis. If one of the Venn, Euler, or Veitch diagram regions is normally selected (e.g., by left clicking or double clicking), then in block 270, a pop-up window presents detailed drill-down information about the selectively identified security system entities having authorization to perform all of the selected steps represented by that region, and which have no authorization to perform any of the other selected steps.

It should be observed that although various sources provide various definitions of "Euler diagrams" or "Venn diagrams," these definitions may be too narrow for construing those terms as they are used in the claims. For example, the Microsoft Encarta® dictionary defines a "Venn diagram" as "a mathematical diagram representing sets as circles, with their relationships to each other expressed through their overlapping positions, so that all possible relationships between the sets are shown." This definition is admirable for its simplicity, and it is not a bad one for gaining a basic understanding of Venn diagrams in general. But its reference to "circles" makes it too narrow to be used in claim construction. Many Venn diagrams use elongated ellipses, not circles. Other Venn diagrams use far more creative shapes.

Frank Ruskey and Mark Weston, author of "Venn Diagrams" in *The Electronic Journal of Combinatorics* (edition dated Jun. 18, 2005), previously incorporated by reference, provide a more elaborate definition of a Venn diagram: "Let $C=\{C_1, C_2, \ldots, C_n\}$ be a collection of simple closed curves drawn in the plane. The collection C is said to be an independent family if the region formed by the intersection of $X_1$, $X_2, \ldots X_n$ is nonempty, where each $X_i$ is either $int(C_i)$ (the interior of $C_i$) or is $ext(C_i)$ (the exterior of $C_i$). If, in addition, each such region is connected and there are only finitely many points of intersection between curves, the C is a Venn diagram . . . ." As elegant and complex as this definition is, the reference to "simple closed curves drawn in a plane" is still too limiting. After all, FIG. 4 depicts intersecting contours that have three-dimensional appearances. Nevertheless, persons of ordinary skill in the art would still recognize these intersecting contours as a type of Euler diagram or Venn diagram.

In an effort to draft claims that encompass all of the described embodiments, reference in some of the originally presented claims is made to intersecting "contours." For example, one originally presented claim recites a Venn diagram that comprises "a collection of n contours that intersect to form $2^n$ regions, wherein each contour corresponds to one of the selected activities, n equals the number of selected activities, and each intersecting region uniquely represents a corresponding intersection of selected activities." It is to be understood that the reference to "contours" encompasses both two-dimensional contours (e.g., the intersecting ellipses of FIGS. 5 and 6) and three-dimensional-looking contours (e.g., the intersecting three-dimensional discs with raised intersecting regions of FIG. 4). The "contours" may comprise circles, ellipses, rectangles, boxes, or much more creative closed boundaries and objects.

In should be noted that there are other diagrams closely related to Venn diagrams. For example, Euler diagrams are similar to Venn diagrams but do not have to represent all of the possible relations. Indeed, a Venn diagram is a special case of an Euler diagram. Spider diagrams are extensions of Euler diagrams that add curves intersecting points within contours to represent the OR condition. Veitch diagrams, also known as Karnaugh maps, are also frequently used to visualize the intersection of up to four different variables.

There are also special types of Venn diagrams. A convex Venn diagram is a Venn diagram in which each of the intersecting contours is a convex curve. The use of convex Venn diagrams is preferred, where feasible, because it provides a more visually intuitive display of potential SOD conflicts. A congruent Venn diagram is one in which the intersecting contours are congruent, that is, they have equivalent shapes. The use of congruent Venn diagrams is also often preferred because a congruent Venn diagram may provide a more visually attractive display than a non-congruent Venn diagram. FIGS. 5 and 6 depict convex, congruent Venn diagrams. An area-proportional diagram is one in which each region's area is proportional to the population of that area. An area-proportional diagram would be preferred where it is desirable for the diagram itself to graphically depict the relative proportions of the intersecting areas. Preferably, the user interface would provide settings allowing the user to toggle between area-proportional and congruent diagrams.

Although the foregoing specific details describe various embodiments of the invention, persons reasonably skilled in the art will recognize that various changes may be made in the details of the apparatus or method of this invention without departing from the spirit and scope of the invention as defined in the appended claims.

The present invention includes several independently meritorious inventive aspects and advantages. Unless compelled by the claim language itself, the claims should not be construed to be limited to structures that incorporate all of the inventive aspects, or enjoy all of the advantages, disclosed herein.

It is well established that the claims of the patent serve an important public notice function to potential competitors—enabling them to not only determine what is covered, but also what is not covered—by the patent. And a number of Federal Circuit decisions have emphasized the importance of discerning the patentee's intent—as expressed in the specification—in construing the claims of the patent.

But defendants in patent infringement suits—while arguing the importance of this public notice function—often seek strained and uncharitable constructions of the claims that would render them either nonsensical, too narrow to have any significant value, or so broad that the claim is anticipated by the prior art. Counsel for defendants routinely flog minor grammatical, typographical, or syntactical flaws, if any, in the claims or specification, forgetting that patents are generally written by—and for—engineers and technicians, not by and for grammatical perfectionists and English language PhD's. Furthermore, defendants frequently misconstrue the specification and prosecution history in claim construction briefs and hearings in an effort to import contrived and novel limitations into the construction of the claims. They also frequently strive to—in essence—rewrite the claims so that they do not cover the accused device.

Accordingly, I wish to make my intentions clear—and at the same time put potential competitors on clear public notice. It is my intent that the claims receive a liberal construction and be interpreted to uphold and not destroy the right of the inventor. It is my intent that the claim terms be construed in a charitable and common-sensical manner, in a manner that encompasses the embodiments disclosed in the specification and drawings without incorporating unrecited, unnecessary limitations. It is my intent that the claim terms be construed as broadly as practicable while preserving the validity of the claims. It is my intent that the claim terms be construed in a manner consistent with the context of the overall claim language and the specification, without importing extraneous limitations from the specification or other sources into the claims, and without confining the scope of the claims to the exact representations depicted in the specification or drawings. It is also my intent that not each and every term of the claim be systematically defined and rewritten. Claim terms and phrases should be construed only to the extent that it will provide helpful, clarifying guidance to the jury, or to the extent needed to resolve a legitimate, good faith dispute that is material to the questions of validity or infringement. Otherwise, simple claim terms and phrases should be presented to the jury without any potentially confusing and difficult-to-apply definitional construction.

It is also to be understood that the terminology employed in the Summary of the Invention and Detailed Description sections of this application is for the purpose of describing particular embodiments. Unless the context clearly demonstrates otherwise, is not intended to be limiting. In this specification and the appended claims, the singular forms "a," "an" and "the" include plural references unless the context clearly dictates otherwise. Conversely, it is contemplated that the claims may be drafted to exclude any optional element or be further limited using exclusive terminology as "solely," "only" and the like in connection with the recitation of claim elements or by use of a "negative" limitation. It is also contemplated that any optional feature of the inventive variations described herein may be set forth and claimed independently, or in combination with any one or more of the features described herein.

The headquarters building of the World Intellectual Property Organization bears the following inscription: "Human genius is the source of all works of art and invention; these works are the guarantee of a life worthy of me; it is the duty of the State to ensure with diligence the protection of the arts and inventions." It is my intent that the claims of this patent be construed—and ultimately enforced, if necessary—in a manner worthy of this mandate.

I claim:

1. A method of performing a segregation of duties analysis on a back office software system that divides an enterprise function into a plurality of different activities and enables assignment of each activity to one or more security system entities authorized to execute that activity, the method comprising:

using an enterprise resource planning software module on a computer to assign activities to security system entities;

using a segregation-of-duties software module that interacts with the enterprise resource planning module to select activities of the enterprise function that are to preferably be kept separate;

using the segregation-of-duties software module to identify security system entities having authorization to perform each of the selected activities of the enterprise function; and using the segregation-of-duties software module to analyze the security system entities and activities assigned by the enterprise resource planning software module to graphically display each of the selected activities of the enterprise function as a contour that represents that selected activity;

wherein the segregation-of-duties software module graphically displays at least some of the contours as intersecting other contours representing other selected activities of the enterprise function to form multiply intersecting, dually intersecting, and non-intersecting regions, wherein the display of the contours form a Euler diagram;

displaying in association with each region formed by the intersection of contours an indication of a quantity of identified security system entities that have authorization to perform all selected activities represented by that region, but which do not have authorization to perform any selected activities not represented by that region; and wherein the segregation-of-duties software module marks the regions in a manner that visually differentiates between multiply intersecting, dually intersecting, and non-intersecting regions, wherein the regions are marked according to the number of contours in which they are contained.

2. The method of claim 1, wherein each region formed by the intersection of contours is selectable, the method further comprising:

displaying, in response to selection of a region, detailed drill-down information about any identified security system entities that have authorization to perform all of the selected activities represented by that region, but which do not have authorization to perform selected activities not represented by that region.

3. The method of claim 1, wherein the contours are congruent and wherein the display of the contours form a congruent Venn diagram.

4. The method of claim 1, wherein each of the regions formed by intersections of contours have the same area.

5. The method of claim 1, wherein the display of the contours form an area-proportional diagram, whereby each of the regions formed by intersections of contours have an area that is proportional to a count of selectively identified security system entities that have authorization to perform all selected activities represented by that region, but which do not have authorization to perform any selected activities not represented by that region.

6. A computer readable medium tangibly embodying a representation of a program of instructions adaptable to be executed by a computer to perform the following:
- interact with an enterprise resource planning module, which is used to assign activities to security system entities, to select activities of an enterprise function that are to preferably be kept separate;
- identify security system entities having authorization to perform each of the selected activities of the enterprise function;
- analyze the security system entities and activities assigned by the enterprise resource planning module;
- graphically display each of the selected activities of the enterprise function as a contour that represents that selected activity;
- graphically display at least some of the contours as intersecting other contours representing other selected activities of the enterprise function to form multiply intersecting, dually intersecting, and non-intersecting regions, wherein the display of the contours form a Euler diagram;
- display in association with each region formed by the intersection of contours an indication of a quantity of identified security system entities that have authorization to perform all selected activities represented by that region, but which do not have authorization to perform any selected activities not represented by that region; and
- mark the regions in a manner that visually differentiates between multiply intersecting, dually intersecting, and non-intersecting regions according to the number of contours in which they are contained.

7. The computer readable medium of claim 6, wherein the program of instructions further enables the computer to perform the following:
- display, in response to selection of a region, detailed drill-down information about any identified security system entities that have authorization to perform all of the selected activities represented by that region, but which do not have authorization to perform selected activities not represented by that region.

8. The computer readable medium of claim 6, wherein the program of instructions enables the computer to generate four-contour Venn diagrams representing four selected activities.

9. The computer readable medium of claim 6, wherein the program of instructions enables the computer to generate five-contour Venn diagrams representing five selected activities.

10. A method of doing business comprising delivering, selling, or offering to sell a program of instructions adapted to be executed by a computer to perform the following:
- interact with an enterprise resource planning module, executing on a computer, to assign activities to security system entities and to select activities of an enterprise function that are to preferably be kept separate;
- identify security system entities having authorization to perform each of the selected activities of the enterprise function;
- analyze the security system entities and activities assigned by the enterprise resource planning module;
- graphically display each of the selected activities of the enterprise function as a contour that represents that selected activity;
- graphically display at least some of the contours as intersecting other contours representing other selected activities of the enterprise function to form multiply intersecting, dually intersecting, and non-intersecting regions, wherein the display of the contours form a Euler diagram;
- display in association with each region formed by the intersection of contours an indication of a quantity of identified security system entities that have authorization to perform all selected activities represented by that region, but which do not have authorization to perform any selected activities not represented by that region; and
- mark the regions in a manner that visually differentiates between multiply intersecting, dually intersecting, and non-intersecting regions according to the number of contours in which they are contained.

11. The method of claim 10, wherein the program of instructions further enables the computer to perform the following:
- display, in response to selection of a region, detailed drill-down information about any identified security system entities that have authorization to perform all of the selected activities represented by that region, but which do not have authorization to perform selected activities not represented by that region.

12. The method of claim 10, wherein the program of instructions enables the computer to generate four-contour Venn diagrams representing four selected activities.

13. The method of claim 10, wherein the program of instructions enables the computer to generate five-contour Venn diagrams representing five selected activities.

14. A method of doing business comprising performing, within the United States, some part of a segregation of duties analysis that comprises the following steps:
- interacting with an enterprise resource planning module, executing on a computer, to assign activities to security system entities and to select activities of an enterprise function that are to preferably be kept separate;
- identifying security system entities having authorization to perform each of the selected activities of the enterprise function;
- analyzing the security system entities and activities assigned by the enterprise resource planning module;
- graphically displaying each of the selected activities of the enterprise function as a contour that represents that selected activity;
- graphically displaying at least some of the contours as intersecting other contours representing other selected activities of the enterprise function to form multiply intersecting, dually intersecting, and non-intersecting regions, wherein the display of the contours form a Euler diagram;
- displaying in association with each region formed by the intersection of contours an indication of a quantity of identified security system entities that have authorization to perform all selected activities represented by that region, but which do not have authorization to perform any selected activities not represented by that region; and
- marking the regions in a manner that visually differentiates between multiply intersecting, dually intersecting, and non-intersecting regions according to the number of contours in which they are contained.

15. A method of doing business comprising performing a business function, wherein completion of the business function requires that the business function be authorized by at least two different people, and wherein that business function has been subjected to a segregation-of-duty analysis that comprises the following steps:
   interacting with an enterprise resource planning module, executing on a computer, to assign activities to security system entities and to select activities of an enterprise function that are to preferably be kept separate;
   identifying security system entities having authorization to perform each of the selected activities of the enterprise function;
   analyzing the security system entities and activities assigned by the enterprise resource planning module;
   graphically displaying each of the selected activities of the enterprise function as a contour that represents that selected activity;
   graphically displaying at least some of the contours as intersecting other contours representing other selected activities of the enterprise function to form multiply intersecting, dually intersecting, and non-intersecting regions, wherein the display of the contours form a Euler diagram;
   displaying in association with each region formed by the intersection of contours an indication of a quantity of identified security system entities that have authorization to perform all selected activities represented by that region, but which do not have authorization to perform any selected activities not represented by that region; and
   marking the regions in a manner that visually differentiates between multiply intersecting, dually intersecting, and non-intersecting regions according to the number of contours in which they are contained.

\* \* \* \* \*